US012349659B2

(12) United States Patent
Gordillo Lopez et al.

(10) Patent No.: US 12,349,659 B2
(45) Date of Patent: Jul. 8, 2025

(54) INTERCHANGEABLE SYSTEM OF WEARABLES THAT HOLD A MOBILE DEVICE FOR PETS

(71) Applicants: Alex Valeria Gordillo Lopez, Mexico City (MX); Xavier Abimael Monroy Franco, Mexico City (MX)

(72) Inventors: Alex Valeria Gordillo Lopez, Mexico City (MX); Xavier Abimael Monroy Franco, Mexico City (MX)

( * ) Notice: Subject to any disclaimer, the term of this patent is extended or adjusted under 35 U.S.C. 154(b) by 78 days.

(21) Appl. No.: 18/255,990

(22) PCT Filed: Oct. 28, 2021

(86) PCT No.: PCT/IB2021/059994
§ 371 (c)(1),
(2) Date: Jun. 5, 2023

(87) PCT Pub. No.: WO2022/123343
PCT Pub. Date: Jun. 16, 2022

(65) Prior Publication Data
US 2024/0049687 A1    Feb. 15, 2024

(30) Foreign Application Priority Data
Dec. 7, 2020   (MX) ..................... MX/a/2020/013303

(51) Int. Cl.
*A01K 27/00*   (2006.01)
*A01K 11/00*   (2006.01)
*A01K 29/00*   (2006.01)

(52) U.S. Cl.
CPC .......... *A01K 27/009* (2013.01); *A01K 11/008* (2013.01); *A01K 27/001* (2013.01); *A01K 27/006* (2013.01); *A01K 29/005* (2013.01)

(58) Field of Classification Search
CPC .... A01K 11/006; A01K 11/008; A01K 29/00; A01K 29/005; A10K 27/00;
(Continued)

(56) References Cited

U.S. PATENT DOCUMENTS

| 3,505,979 A | 4/1970 | Rosswag |
| 6,003,473 A | 12/1999 | Printz |

(Continued)

FOREIGN PATENT DOCUMENTS

| CA | 2774382 A1 | 7/2012 |
| CN | 206212983 U | 7/2016 |

(Continued)

OTHER PUBLICATIONS

International Search Report and Written Opinion dated Feb. 11, 2022 for International Application No. PCT/IB2021/059994, filed Oct. 28, 2021.

*Primary Examiner* — Peter M Poon
*Assistant Examiner* — Danielle A Clerkley
(74) *Attorney, Agent, or Firm* — Westman, Champlin & Koehler, P.A.

(57) ABSTRACT

The present invention relates to an interchangeable collar system (i.e., collars, leashes, harnesses, vest harnesses, clothing or wearables for animals), which hold a mobile device for pets, which has the particular feature of being interchangeable thanks to the peculiar clip system (or any other fastening means that could have the same purpose, which is to be interchangeable with a large variety of models and accessories for pets), wherein the lugs that protrude at each end of the body of the device and the omega circlips mechanically attached to the collar cooperate to secure the body of the device to the collar, allowing devices and collars to be easily interchanged.

11 Claims, 10 Drawing Sheets

(58) Field of Classification Search
CPC .. A10K 27/001; A10K 27/002; A10K 27/006; A10K 27/008; A10K 27/009; A44C 5/00; A44C 5/185; A44C 5/0007–0046; A45F 5/00; A45F 2005/008; A45F 5/02; A45F 5/10; A45F 2005/1006; A45F 2005/1013; A45F 3/14; A45F 2003/142–146
USPC ........................................................ 119/289
See application file for complete search history.

(56) References Cited

U.S. PATENT DOCUMENTS

| | | | |
|---|---|---|---|
| 9,861,080 | B1 | 1/2018 | Hathway |
| 2002/0069835 | A1 | 6/2002 | Strahm |
| 2002/0135487 | A1 | 9/2002 | Bowling |
| 2007/0204804 | A1 | 9/2007 | Swanson et al. |
| 2013/0299365 | A1* | 11/2013 | Andrew .................. A45F 5/021 206/37 |
| 2016/0143424 | A1* | 5/2016 | Stephens ................. A45F 3/005 224/676 |
| 2018/0110205 | A1 | 4/2018 | Czarnecky |
| 2018/0199546 | A1 | 7/2018 | Temel |
| 2021/0120786 | A1 | 4/2021 | Paulus |

FOREIGN PATENT DOCUMENTS

| | | |
|---|---|---|
| CN | 211086616 U | 10/2019 |
| EP | 3656214 A1 | 11/2018 |
| JP | 2000-14268 A | 1/2000 |
| KR | 10-20130089425 A | 8/2013 |

\* cited by examiner

INTERCHANGEABLE SYSTEM OF WEARABLES THAT HOLD A MOBILE DEVICE FOR PETS

CROSS-REFERENCE TO RELATED APPLICATION

This Application is a Section 371 National Stage Application of International Application No. PCT/IB2021/059994, filed Oct. 28, 2021 and published as WO 2022/123343 A1 on Jun. 16, 2022, in Spanish.

FIELD OF THE INVENTION

The present invention relates to leashes, vest harnesses, clothing, collars, harnesses or any garment or gadget that can be used to put on or dress a domestic or farm animal with "wearables", which has the particular feature of being able to hold an interchangeable and removable mobile device that, among others, serves to track and identify the animal wearing it.

BACKGROUND

Electronic flea control, identification, tracking and training devices for pets and farm animals have become very popular, to some extent due to the miniaturization and low cost of the electronics required for their operation as well as the popularization of mobile devices such as cell phones, tablets, laptops, which can act as a user interface, thus eliminating the cost of such an interface on said electronic devices; one great concern of the owners of pets and farm animals, such as grazing animals (horses, cattle, sheep, goats, etc.) which tend to move freely on the farm or grazing areas and for some reason often stray and go out of sight of the owner, shepherd or person in charge of their care, or even in case of rustling, it is possible to have an effective tracking means to locate the animal and its captors; in the case of domestic animals, these also tend to "escape" and worry their owners to a great extent, or said animals can also be the object of theft, and having them wear a tracking system becomes desirable; furthermore, domestic animals carry an identification plate or a training device, which in all cases are electronic, powered by batteries that in most cases are rechargeable, in particular tracking devices based on GPS (Global Positioning System), or by radiofrequency means of communication such as WiFi, XBee, Bluetooth, among others, require that the battery of the device be constantly recharged, since energizing the antenna for sending and receiving data consumes a lot of energy; the state of the art shows us that said electronic devices are mounted on a strap by means of buckles or slots through which the strap is passed; this has the great drawback of having to remove the collar, harness or clothing on which the device is mounted, to later remove the device from the clothing and be able to recharge the batteries or change them, leaving the animal without a collar for several hours, which is highly undesirable; in addition, in the event that the animal is in training or within a "geofence" and a change of devices is required for recharging or maintenance, or that two or more devices (training device, identifier or tracking, etc,), operate on the same harness leash or clothing, it is not possible, because the devices are closely linked to a particular leash, collar, harness or clothing.

We can find various efforts aimed at covering some of these needs, of which we can mention the following:

CN 211086616 by Luo Jiayong, which describes a tracking device for pets with GPS arranged on a leash, which has a peculiar anchoring system that prevents it from coming off easily, the body of the tracking device has at its ends a rectangular tunnel supported on its sides by a pair of arms, said rectangular tunnel in its upper portion has a slot that houses a rectangular bar having a series of brush-like pointed bars that protrude from its base and secured by means of a latch lock; the leash is passed through the cavity of both rectangular tunnels thus fastening the tracking device to the leash (see FIGS. 1 and 2); to prevent the device from moving on the leash there is an anti-slip system wherein the rectangular bar with brush-like pointed bars is secured in the slot of the rectangular tunnel by means of a latch lock in such a way that the pointed bars are inserted on the leash, thus preventing the device from slipping on the leash.

Another relevant document is US 20180199546 by Weston D. Temel, which also describes the use of a GPS tracking and emergency device that is mounted on a leash, harness or clothing for pets; the GPS tracking and emergency device is arranged on a preferably bronze housing mechanically attached to the leash, harness or clothing, which can be easily removed from the pet by having common quick disconnect clips, so to service or recharge the battery of the tracking and emergency device it is necessary to remove the leash, harness or clothing on the which the bronze housing is attached.

Another document under study is CN 206212983 by an anonymous author, which describes an electronic tracking and positioning device with GPS or Bluetooth arranged on a collar; in a first modality, the electronic tracking and positioning device can be easily removed from the collar, without the need to remove the collar from the pet; in a second modality there is a complex collar with a support that houses the tracking and positioning device, wherein the tracking device can also be removed from the collar, but in this case the collar must be removed from the pet; in the first modality, there is a base that has a pair of lug-like protrusions with a "C" cross section which house a fitting arranged in a counterplate in such a way that the leash is sandwiched between the rear face of the base and the front face of the counterplate (see FIG. 1); the second modality has a metal base that supports a leash in a wristwatch-like manner; said base houses the tracking and positioning device, and also has an inner cover that can be detached from below (see FIGS. 4 and 5), which when detached gives access to the tracking and positioning device.

Another relevant document is EP 3656214 by Matthias Weins, which describes a GPS tracking device for pets which is mounted on a leash without the need to remove the leash from the pet, the tracking device has a housing that is hinged at the middle (see FIG. 2), reminiscent of a wooden jewelry box; the housing houses the tracking device inside; when opening the hinged housing, the lower portion of the housing has a slot that houses the leash, and at the end of said slot it has a row of triangular teeth; the upper portion of the housing on its lower face has two rows of triangular teeth that interact with the row of triangular teeth on the lower portion of the housing, in such a way that they "bite" the leash when the housing is closed, being secured by means of screws.

Another relevant document is US 20070204804 by Swanson, Scott D. et al., which describes and illustrates a collar that integrates a GPS tracking device as well as a training device, which is capable of providing an electrical stimulus to the animal wearing it by means of a pair of electrodes protruding from the housing through the collar; the collar also comprises a GPS antenna, a radiofrequency antenna, an accelerometer, a pair of membrane switches, an LCD display, a loudspeaker, a voltage step-up transformer from the battery to the electrodes, a battery and means to recharge it through a Direct Current (DC) port, plus a led indicator that lets you know when the battery has been charged; the battery feeds the microcontroller that controls collar operation; it should be noted that one of its functions is to be able to give an electric shock to the animal wearing it through the electrodes, with which the behavior of the animal can be corrected and thus help in their training in conjunction with the loudspeaker, which can also emit an audible alarm signal for the animal wearing it. It is evident in the eyes of the technical expert skilled in the art that the collar described by Swanson et al. is extremely invasive, also noting that it is not interchangeable, namely that the housing that houses the electronic components is part of the collar itself, therefore both the collar and the electronic part are not interchangeable, that is, the electronic part cannot be detached and put onto another collar that is more appropriate for the occasion, such as when using a work or training harness is required or when the user needs to use a more attractive collar for a social event, festivity or competition, which would be impossible with this type of collar; this type of collar is also extremely invasive, since the housing that houses the electronic part as well as the electrodes is very large and must always remain in one position, and may even cause injury to the animal wearing it.

The study of the above documents reveals the need for a tracking device on a pet that would prevent suffering, anguish and despair on the part of their owners when they cannot locate their precious pet, but the need is also inferred for the tracking device to be easily removed without removing the pet's or animal's collar, harness, or clothing, since as mentioned above, all tracking devices require servicing or recharging the batteries at some point, which would leave the pet or animal without a collar; it is also necessary to be able to replace a tracking device by another when the battery is "charging" or being serviced, or even to have several devices mounted on the same collar with different functions, such as for biometrics or having contact information of the person in charge, identification data of the animal or pet, medical history (zootechnical), among others; there is also a need to have an interchangeable pairing, that is, that the tracking device can be easily mounted on other collars, leashes or harnesses, depending on the activity to be carried out (walking, training, work, play, festivity, parade, contest, sport, leisure, among others). Thus, the user can have a range of collars, leashes or harnesses that meet their particular needs or tastes, and be able to use them and dress the animal without problems, always having the possibility of safely mounting the tracking device or other typical animal gadgets such as an identification plate, etc.; problems that this solution aims to remedy.

BRIEF DESCRIPTION OF THE INVENTION

A tracking device for pets or farm animals which can be placed on the collar, harness or any clothing placed on the pet or farm animal, which collar, harness or clothing is not necessary to be removed from the pet or farm animal for servicing or to recharge the batteries; rather the tracking device can be easily removed by operating the clips that fasten it to the collar, harness or clothing; in addition to a collar, harness or clothing with the proposed fastening means object of the present invention, a collar, harness or clothing can house one or a plurality of tracking devices, and even house various devices compatible with the fastening means, such as identification plates, whether metallic or electronic, zootechnical biometric devices, lighting devices, among others. The fastening means consist of a pair of omega circlips, preferably made of steel, or of some resilient and rust-resistant metal; in a preferred modality, the omega circlip is attached by means of rivets to the collar, leash, harness or clothing, attaching it firmly thereto. The ends of the omega circlip are resilient and when pressed against each other or attempting to join them, they allow insertion into the lugs of the tracking device or compatible device; once the ends of the omega circlip have been inserted into the lugs, due to their shape they firmly fasten to the lug of the tracking device or compatible device on the surface of the collar, leash, harness or clothing; in an alternative modality, the tracking or compatible device, once secured on the collar, harness or clothing, can be covered by a strip which has been sewn or mechanically attached to the collar, harness or clothing and has some retention means at its other end such as VELCRO, buttons, a rivet and button, a buckle, etc., that is compatible and arranged on the collar, harness or clothing and allows it to be retained covering the tracking device or compatible device.

DETAILED DESCRIPTION OF THE INVENTION

Definitions

The following definitions are provided for the purpose of allowing a better understanding of the invention:

Mechanical attachment—Refers to the union of two or more parts by means of screws and nuts, rivets, arc welding, wire or friction, binder, glue, sewing, among other mechanical means known in the field.

"Approximately"—The use of the term "approximately" provides a certain additional range with respect to the numerical value to which it is being applied. Such additional range is approximately ±10%. In an exemplary but non-limiting manner, if it says "approximately 40 grams", the exact range that is described and/or claimed is comprised between 36 grams and 44 grams.

Collar—In order to avoid tedious repetitions and for the purposes of the present invention, the word is understood as:

collar, leash, vest harness, harness, clothing or wearable for animals; with any of these meanings being used interchangeably.

Device—In order to avoid tedious repetitions and for the purposes of the present invention, the word is understood as the devices, apparatus, gadgets or plates, among others, whether electronic or of any kind that can be mounted on a collar in the form of the present invention; for example, in an illustrative but not limiting way, these can be: Tracking devices, zootechnical biometric devices, lighting devices, alert and sound devices, both electronic and conventional identification devices, aid and rescue devices, etc.

Animal—In order to avoid tedious repetitions and for the purposes of the present invention, the word can be understood as: domestic animals, pets, farm animals or any other animal, whether in the wild or in captivity, that wears a collar with a device.

FIGS. 1 to 11 are used interchangeably in the present description.

Figure 1:
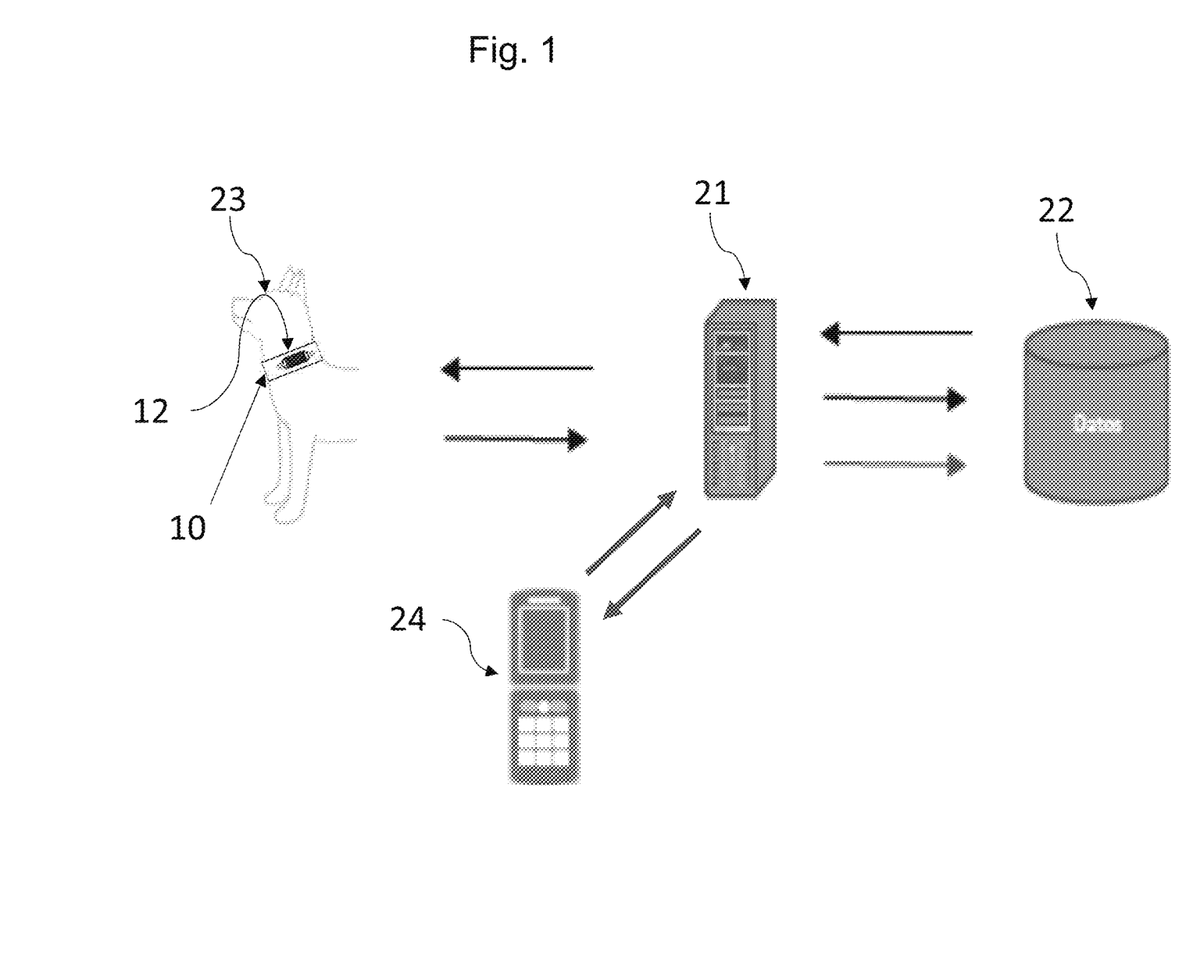
FIG. 1 illustrates a communication diagram between the different elements of the communication and tracking system of the device.
Figure 2:
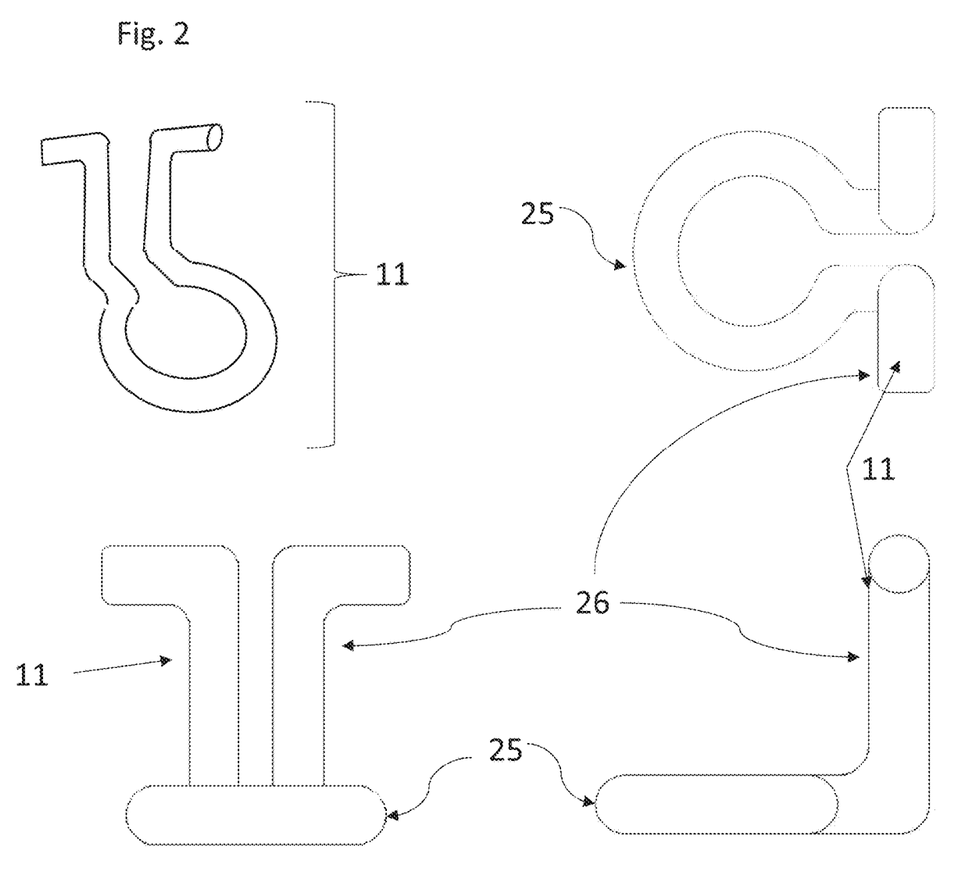
FIG. 2 shows several views of the omega circlip.

FIG. 1 shows a communication diagram between the different elements that make up a GPS tracking system, although the same principles can be used for a system with a smaller coverage area such as a WiFi, radiofrequency, Xbee, Bluetooth tracking system among others, since it requires a device that emits and receives signals, a server (21) or computer device with the capacity to receive and send signals to the emitting device, a database (22) in which to store the data acquired and others required for tracking or some other purpose of the system and a user interface that can be a mobile resource (24) such as a cell phone, laptop, or computer device that allows receiving data and sending data that the user can display and thus interact with the system.

Turning to a preferred modality of the invention, the device (12) has geolocation as well as communication means via GPS and mobile telephony; in an alternative modality, a smaller coverage area can be obtained with some other type of technology such as radiofrequency, which requires a multitude of antennas in the coverage area; in another modality you can have a restricted area of coverage with WiFi, Xbee or Bluetooth technologies among others; in any case, the device (12) has wireless communication with a server (21) which is constantly recording the position of the animal (23); in an alternative modality the device (12) may also be able to record and send data on biometrics, send alerts, have lighting and sound means, among others, that allow interaction with the animal (23) or to monitor its habits, routes, health and vital signs at all times, as well as being able to turn its lighting means on or off to facilitate its location and even a loudspeaker with which to give instructions or communicate with the animal (23) and even sound an alarm that allows alerting the animal (23) or also facilitating its location; the data collected and ordered on the server (21) or computer device are stored in a database and based on the object of tracking or type of service agreed with the user, owner or person in charge of the animal (23), the geolocation of the animal, its vital signs, habits, routes, routines can be sent, among other services, which can be displayed by the user, owner or person in charge of the animal (23) through a mobile resource (24); in an alternative modality, the mobile resource (24) can interact with the device (12) making use of the two-way communication already established with the server (21), while said communication is supported by the mobile telephone network preferably a GSM network, so that from the mobile resource (24) a lighting means could be activated or the voice of the owner or user is heard by the animal and even a microphone could be activated that allows hearing the noises around the animal (23).

In a preferred modality, the device (12) consists of an electronic card or electronic circuit that comprises a microprocessor coupled to an antenna and a mobile telephone "chip" (preferably GSM); said "chip" in a preferred modality can comprise a "SIM" card or a virtual "SIM" card in both cases associated with a GSM mobile telephone network, which are powered by a rechargeable battery; in an alternative modality, the microcontroller can have electronically coupled biometric sensors, an accelerometer, electrodes that allow giving an electric shock to the animal (23), a microphone, lighting means, a loudspeaker, among others; the microprocessor, by means of the antenna and GSM mobile telephone "chip," obtains and processes the geolocation coordinates, and by means of the antenna it sends the geolocation data to the server (21) using a standard communication protocol; in an alternative modality, the microcontroller can send to the server (21) data collected with the sensors or peripheral equipment with which it is equipped, and by the same means the server (21) can activate the microphone, loudspeaker, reprimand means (electric shock) or the lighting means in case the device (12) is equipped with these.

Figure 4A:
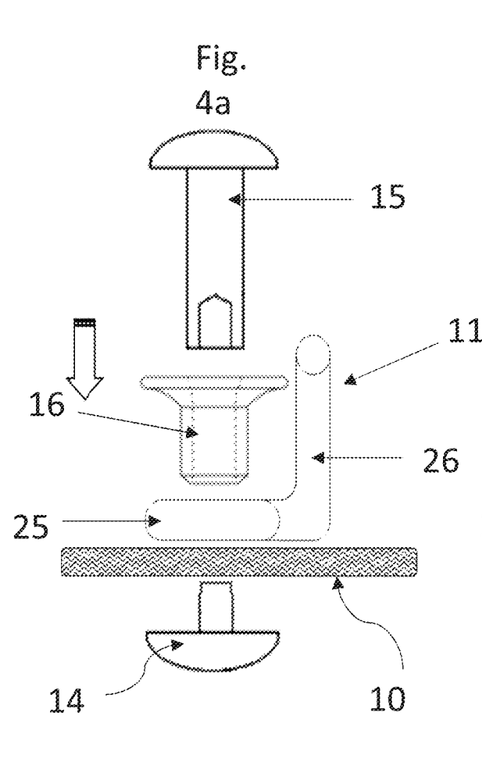
FIG. 4a shows a rivet assembly with head and insert.
Figure 4B:
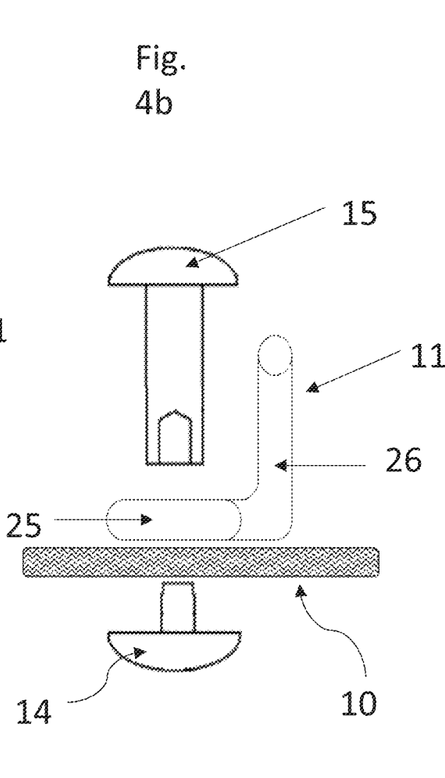
FIG. 4b shows a rivet assembly with a head.
Figure 4C:
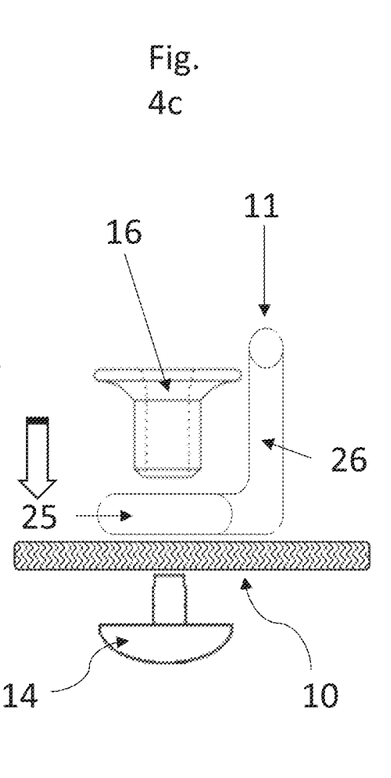
FIG. 4c shows a rivet assembly with an insert.

The device (12) is mounted on a collar (10) by means of an ingenious clip system made up of an omega circlip (11) (illustrated in FIG. 2), which cooperates with the lug (20) arranged at the end of the body (19); said omega circlip (11) is preferably manufactured from a round extruded steel bar or some other engineered metal or thermoplastic (in this case the omega circlip (11) is obtained by molding) that allows it to have good resilience, low fatigue, and anticorrosive properties; the omega circlip has a base (25) which is frustro-toroidal from which emanate a pair of fingers (26) that stand vertically substantially perpendicular to the base, which at their upper end are bent substantially perpendicular to the vertical in opposite or mirror directions (see FIG. 2); the aforementioned base (25) is mechanically attached to the collar (10), in a preferred modality this is by means of a rivet (14) which is passed through the inner diameter of the base (25) (see FIGS. 4a, 4b, 4c, 5) and a through hole provided for this purpose in the collar (10); FIG. 4a shows a modality in which the rivet (14) has an insert (16) and a head (15), the insert is placed inside the inner diameter of the base (25), due to its upper mushroom shape the insert is coupled to the upper face of the base (25) fastening it firmly, the insert (16) has a through hole which houses the stem of the head (15) which in turn is coupled to the lower portion of the rivet (14) either by means of a thread or by an interference assembly under cold or hot pressure, which allows a permanent deformation between the rivet (14) and the stem of the head (15) thus attaching the omega circlip (11) to the collar (10); in the modality represented in FIG. 4b, the rivet lacks the insert (16) so the head (16) is inserted into the inner diameter of the base (25) and through hole of the collar (10) thus when screwing the stem of the head (16) with the rivet (14) they attach the omega circlip (11) to the collar (10), or in case of assembly by interference with cold or hot pressure, the stem of the head (15) is deformed with the rivet (14) attaching the omega circlip (11) to the collar (10); FIG. 4c shows another alternative modality which lacks a head (15) so that the insert (16) is passed through the inner diameter of the base (25) and the through hole of the collar (10) so that the insert (16) can be threaded onto the rivet (14) or in the case of interference assembly with hot or cold pressure the insert (16) and rivet (14) are permanently deformed thus attaching the omega circlip (11) to the collar (10).

Figure 5:
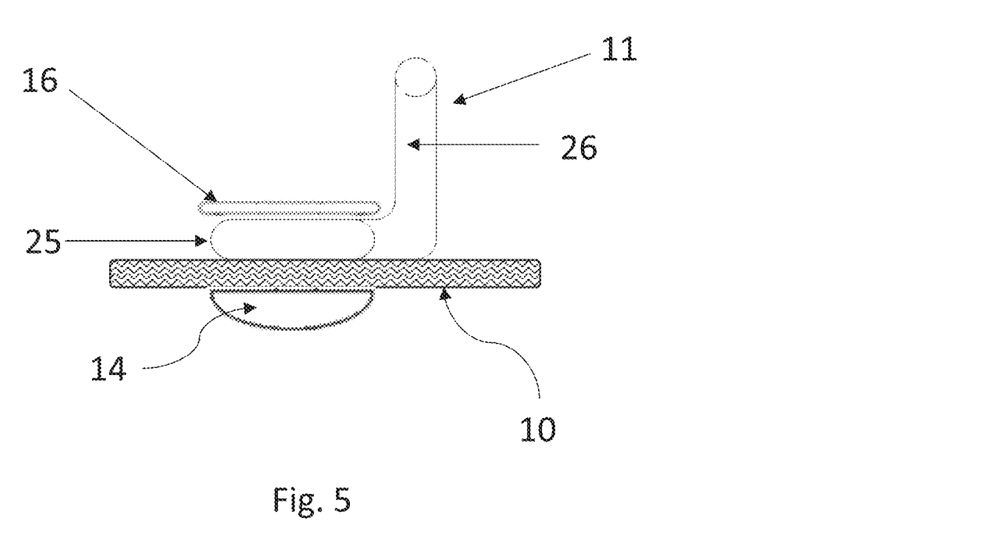
FIG. 5 shows an omega circlip attached to the collar.
Figure 6:
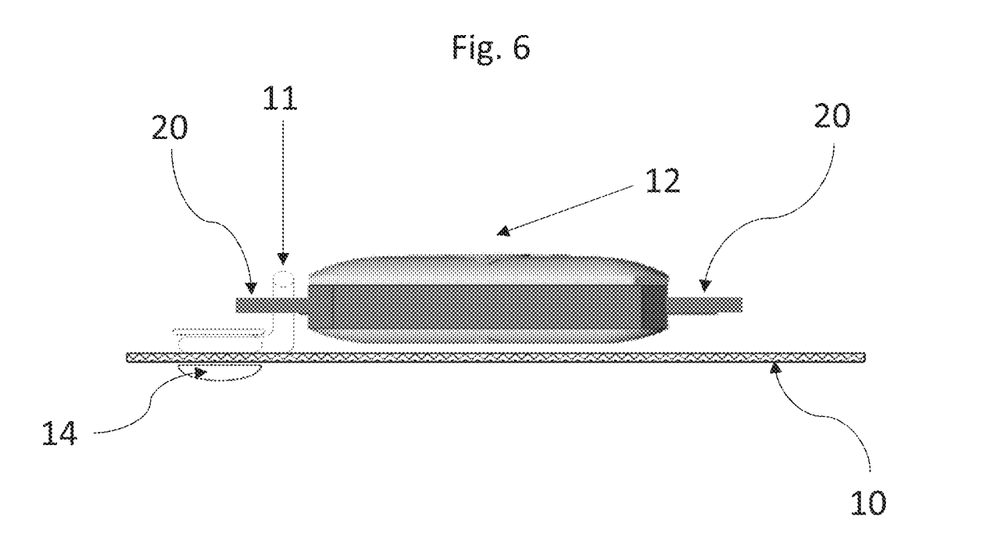
FIGS. 6 and 10 show an omega circlip attached to the collar and fastening to a lug of the body of the device.

FIG. 5 shows a preferred modality wherein an omega circlip (11) is fastened to the collar (10) by means of a rivet (14) with an insert (16), this assembly allows a permanent attachment of the clip (11) to the collar (10) that is free of maintenance or adjustments, which is not invasive or uncomfortable for the animal 23 that wears the collar (10) because the rivet (14) has a hemispherical shape, another advantage of the omega circlip (11) assembly to the collar (10) by means of rivets (14) is that it allows the lower face of the base (25) to be coupled to the upper face of the collar (10) promoting the verticality of the fingers (26), which is critical to be able to grasp the device (12) by the lugs (20).

Figure 3:
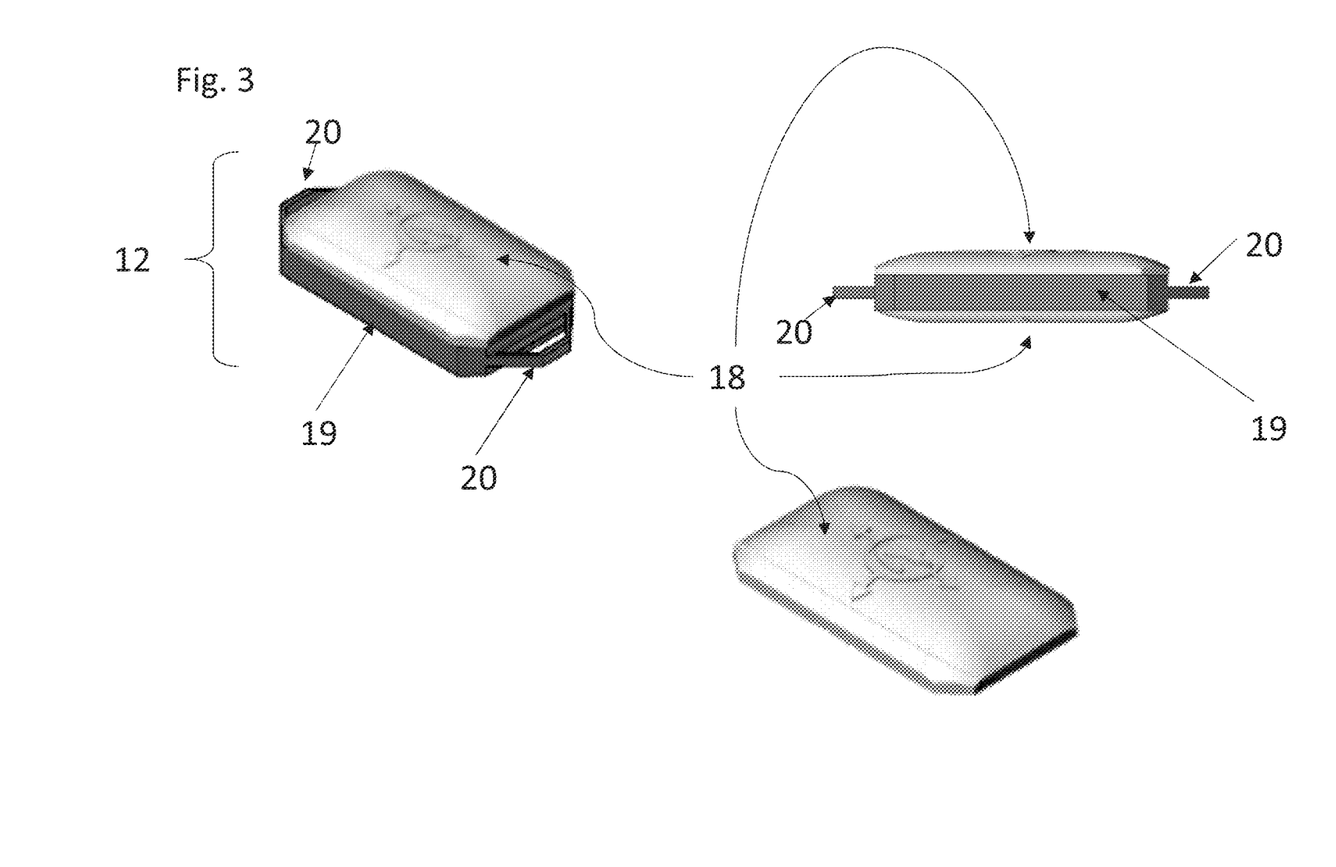
FIG. 3 shows several views of the body and covers of the device.

In a preferred modality, the device (12) consists of a housing that comprises a body (19) covered by a pair of upper and lower covers (18) (see FIG. 3). The body (19) of the device (12) has means for housing the electronic card or electronic circuit, batteries, and other peripherals that are required for the proper operation of the device (12) in any of its modalities; a lug (20) protrudes from the body (19) at each end, which houses the fingers (26) of the omega circlip (11); however, both the covers (18) and the body (19) are manufactured in an engineered thermoplastic by means of molding; the covers (18) are placed on the body (19) by means of interference assembly, "snapping" or using a binder, among others; in an alternative modality, the body (19) can consist of a slot or hole that allows exposing a USB port (in any of its presentations or modalities) or a charging port that allows charging the inner battery and in an alternative modality that also allows wired communication with the microcontroller; in an alternative modality, the device (12) can lack the covers (18) and only consist of the body (19), which can house a metal or plastic plate that allows identifying the animal wearing it; in another alternative modality, the body (19) can house light-emitting means coupled to a rechargeable battery and, where appropriate, an electronic control; in another alternative modality, the body (19) can house any electronic device, tracking means, communication means, identification means, electronic training means, among others.

Figures 7A, 7B:
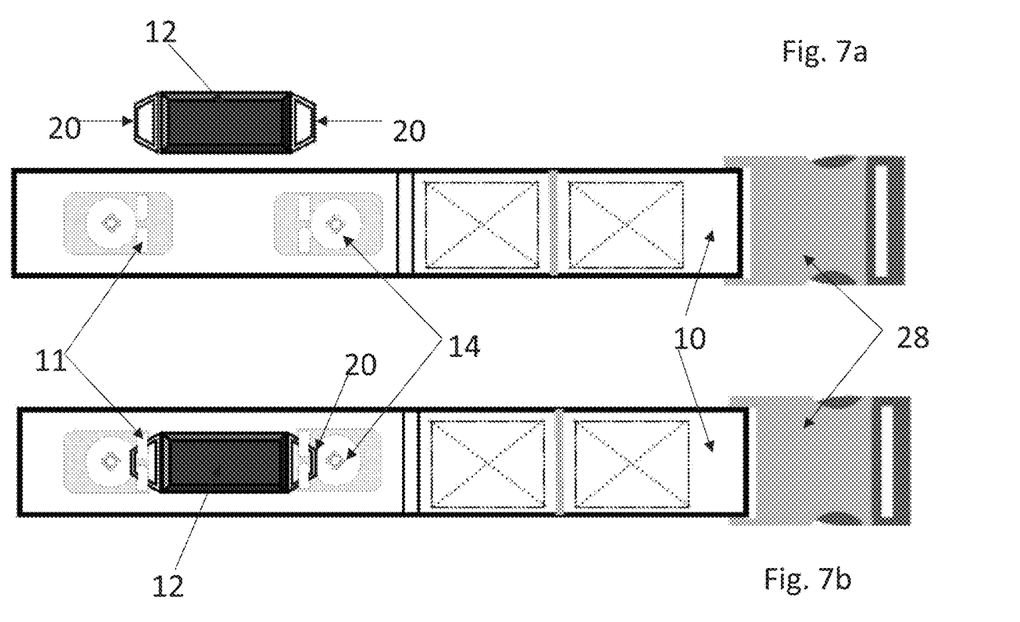
FIGS. 7a and 9a show a diagram of the collar and an uncoupled device.
FIGS. 7b and 9b show a diagram of the collar and a coupled device.
Figures 9A, 9B:
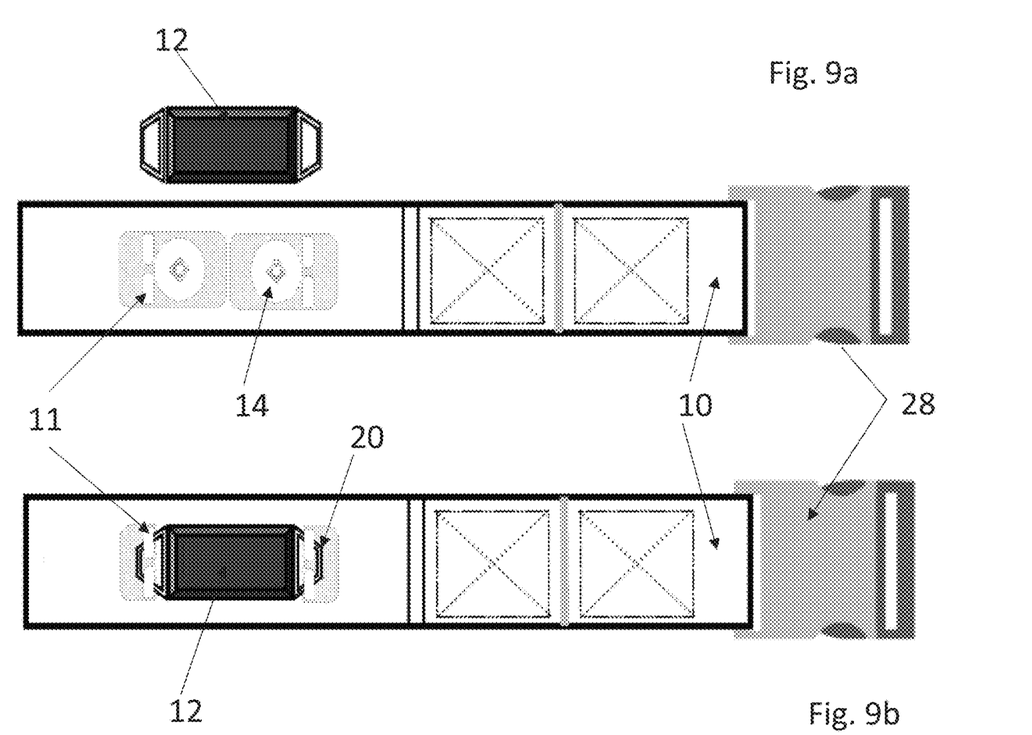
Figure 10:
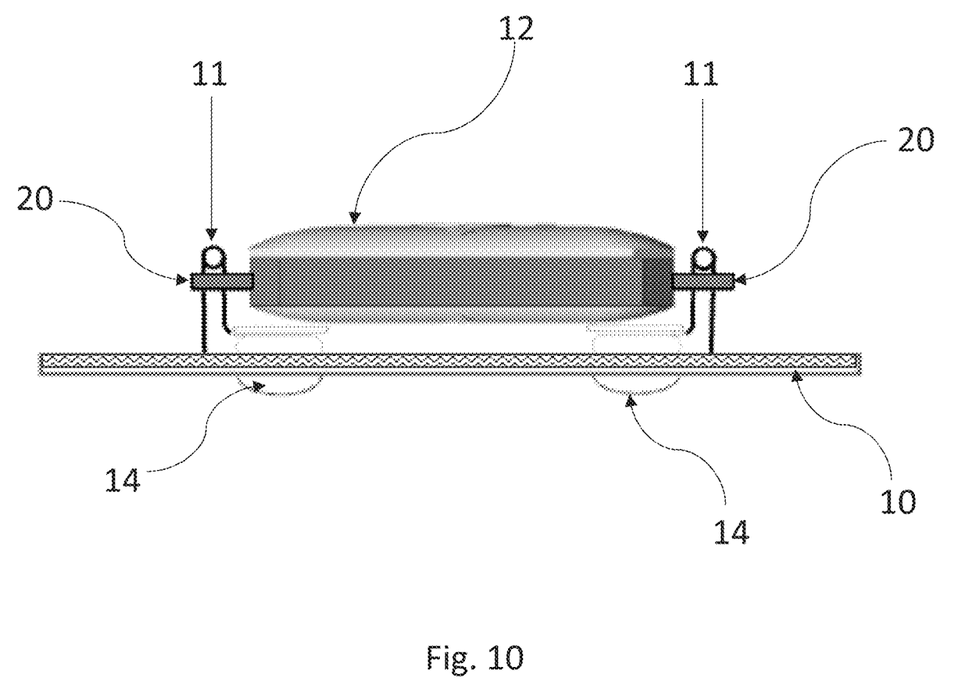

However, FIGS. 7a and 7b show a diagram of the collar and device (12) wherein the collar is shown in a first preferred modality with the omega circlips (11) arranged in a mirror fashion firmly fastened to the collar (10) by means of rivets (14) at one end of the collar (10); in this first modality, the omega circlips (11) arranged in a mirror fashion are oriented "outwards", that is: the vertical outer face of the fingers (26) of said omega circlips (11) are facing each other, which causes the rivets (14) to be visible on the collar (10) without being covered by the tracking device (12) when it is mounted on the omega circlips (11), as illustrated in FIG. 7b; in the second preferred modality, the omega circlips (14) arranged in a mirror fashion are oriented "inwards", that is the base (25) of each omega circlip (11) and therefore the rivets (14) are at their closest point, and the vertical outer faces of the fingers (26) do not face each other, which causes the rivets (14) and the bases (26) to be covered by the tracking device (12) when mounted on the omega circlips (11), as illustrated in FIGS. 9a and 9b; in any modality, the collar (10) has a buckle (28) arranged at a first end that accommodates or is clipped to the second end of the collar (10), which can be provided with holes that house a pin, or simply be inserted inside the buckle (28) which has teeth and a pressure mechanism; in an alternative modality, the buckle (28) arranged at the first end of the collar (10) clips into a counter buckle arranged at the second end of the collar (10), either by means of a "snap" assembly, button and buttonhole, or some other clipping means; in any modality, the collar (10) is removed by unclipping the buckle (28) from the second end of the collar (10), which represents a means of fastening/removing the collar (10) from the body of the animal (23); said FIGS. 7a, 7b, 9a, 9b are useful to understand the mounting and detachment of the device (12) on the collar (10), the device (12) is mounted on the collar (10) which is duly provided with at least one pair of omega circlips (11) arranged in a mirror fashion strongly attached to the collar (10) by means of mechanical attachment.

It should be noted at this point that the lugs (20) have a "trapezoidal" shape, that is, the inner hole delimited by the lug (20) is wider where it is closer (proximal) to the body (19), the distal side from the lug (20) to the body (19) thus being narrower (see FIGS. 3, 7a, 9a); thus forming a "trapezoid" that allows easy insertion of the fingers (26) on the proximal side of the body (19) where the hole is wider, in such a way that once the fingers (26) are inserted in said area of the lug (20) proximal to the body (19), they tend to run towards the distal end of the lug (20), thus securing the lug (20) at the part where the hole is narrower (see FIGS. 7b, 9b), this causes the trapezoidal shape of the lug (20) to fasten to the fingers (26) and these in turn exert a force on the inner portion of the lug (20) at its distal end, coupled with the fact that the fingers (26) at their upper end are bent substantially perpendicular to the vertical in a mirror fashion in opposite directions (see FIG. 2) in such a way that the bent upper ends of the fingers (26) fasten to the top of the lug (20), thus fastening it against the outer face of the collar (10) (see FIGS. 6, 8, 10, 11) thus securing the body (19) to the collar (10); this type of "clip" allows the device (12) to be secured to the collar (10) firmly and safely, without the device (12) tending to come off due to external forces to which it may be subjected due to the activity of the animal wearing it, a lug with a "rectangular" or "U" shape seems undesirable since it will only depend on the resilience force of the fingers (26) on the "U-shaped" or "rectangular" lug, without any possibility of the fingers (26) grasping properly inside the hole of the "U-shaped" or "rectangular" lug, in addition to the fact that this "clip" in a "U-shaped" or "rectangular" lug does not withstand well the external vibrations or forces to which the device (12) arranged on the collar (10) will be subjected, namely that animals wearing it are usually very active, or go into bushes or scratch themselves, among other activities, which would cause them to easily detach the device (12) from the collar (10); something that does not happen with the "clipping" of the fingers (26) in a lug (20) with a trapezoidal shape described above, namely detaching it requires pressing the fingers (26) one against the other and sliding them inside the lug (20) towards the body (19) wherein, once located at that end (where the hole of the lug (20) is widest) pushing the fingers down and pulling the body (19) up; compared to a clip with "U-shaped" or "rectangular" lugs where the lug hole has the same width at either end and only requires pressing the fingers (26) to extract one of them from the "U-shaped" or "rectangular" lug, thus causing the unclipping of the fingers (26) from the "U-shaped" or "rectangular" lug, thus evidencing that this clip is not reliable, facilitating the uncoupling of the fingers (26) from the "U-shaped" or "rectangular" lug.

Figure 8:
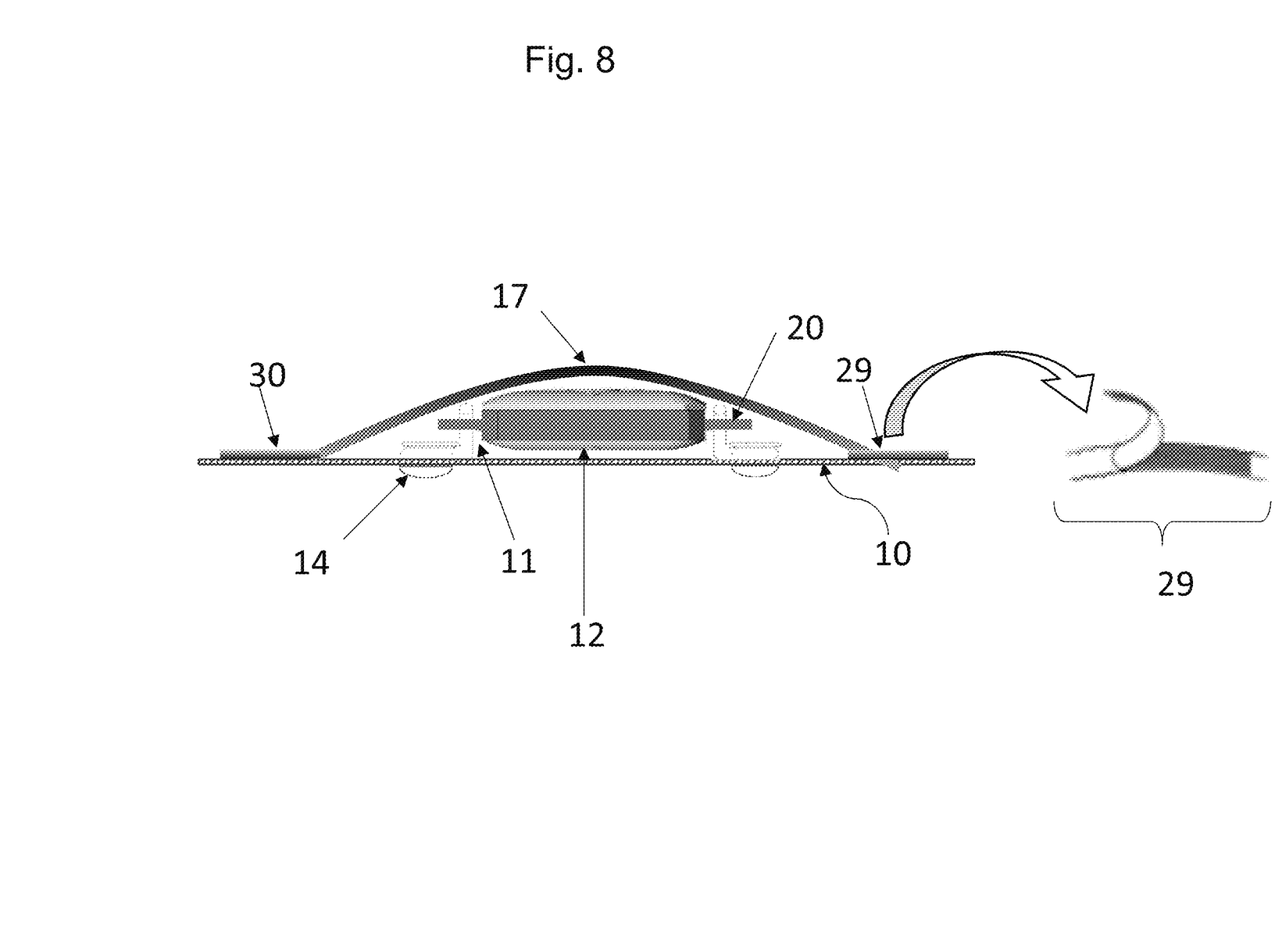
FIGS. 8 and 11 show a device coupled to the collar and protected by a covered strap.
Figure 11:
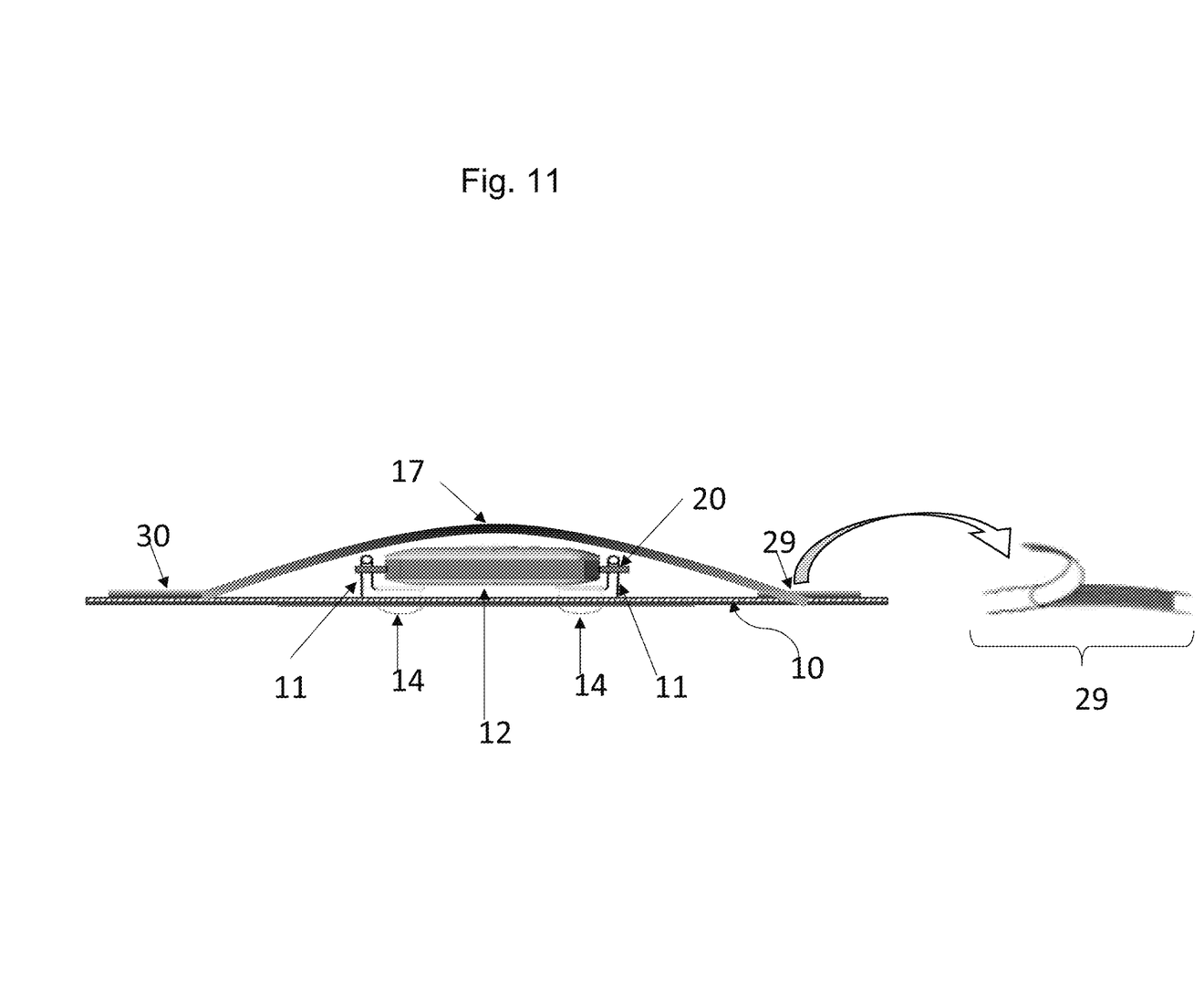

In an alternative embodiment illustrated in FIGS. 8, 11 the collar (10) is provided with a covered strip (17) which at its distal end (30) is sewn, riveted or mechanically attached to the collar 10, the proximal end (29) of the covered strip (17) is provided with some temporary fastening means, that is, it allows its detachment from the collar (10) which, in an illustrative and non-limiting way, can be VELCRO, a rivet with a resilient button, a button and a buttonhole, among others, said covered strip (17) has the function of protecting the device (12) from the surrounding environment, namely that animals 23 are exposed to nature and inclement weather, therefore protecting the device (12) from water splashes, raindrops, mud, blows from branches or other animals; preventing the device (12) from being torn off by the activities of the animal (23), among other eventualities, is a very good idea, at most that said covered strip (17) grants discretion to the collar (10) and device (12) by covering it and hiding it in some way, thus being able to prevent its theft or attract unnecessary attention.

The peculiar clip system of a body (19) of a device (12) with trapezoidal lugs (20) that are secured by means of a pair of omega circlips (11) arranged in a mirror fashion where said pair of omega circlips (11) are fastened to the collar (10) by means of mechanical attachment; the clip system at issue allows to exchange bodies (19) with different collars (10), thus also allowing a collar (10) to house a body (19) for each pair of omega circlips (11) arranged in a mirror fashion having, being able to have, two or a plurality of pairs of antagonistic omega circlips (11); thus it is possible to remove a body (19) from a collar (10) and mount another body (19) of another diverse compatible device on said collar (10); or have a variety of collars (10) that will serve different purposes such as training, walking, restraint, tracking, communication, some festivity or event, among others, allowing to dress the animal with one of many collars (10) and be able to mount a body (19) on them with the required functionality (e.g., identification, tracking, communication, lighting, assistance, among others) by the owner, user or person in charge of the animal.

Among the preferred modalities are the following:

1. An interchangeable system of wearables for animals having among others a device with a body having a fastening means with which the device is secured to the wearable for animals.

2. The interchangeable system of wearables for animals of number 1, wherein the fastening system has, among others, a protruding lug at each end of the body of the device, at least one pair of clips fastened to the wearable for animals by mechanical attachment, wherein the aforementioned clips cooperate with the lug to fasten the body of the device to the wearable.

3. The interchangeable system of wearables for animals of number 2, wherein the clips are omega circlips that are made up of a semi-toroidal base from which emanate a pair of fingers that are substantially perpendicular to the semi-toroidal base and ends of said omega circlips are bent at right angles in opposite directions.

4. The interchangeable system of wearables for animals in number 3, wherein the protruding lug at each end of the body of the device has a trapezoidal geometry that allows the fingers of the omega circlip to be inserted through a wider proximal portion of the lug to the body of the device, wherein the fingers once inserted slide into a narrower distal end of the lug securing an upper portion of the lug to a bent upper end of the fingers.

5. The interchangeable system of wearables for animals of number 1, wherein the device further comprises: a pair of covers that cover the body of the device.

6. The interchangeable system of wearables for animals of number 1, wherein the device houses tracking means such as a GPS.

7. The interchangeable system of wearables for animals of number 2, wherein the wearable can have two or more pairs of clips, wherein each pair of clips secures a device body.

8. The interchangeable system of wearables for animals of number 1, wherein the body of the device is protected by a covered strip once it is clipped to the wearable for animals.

9. The interchangeable system of wearables for animals of number 8, wherein the covered strap at a first end is mechanically attached to the wearable for animals, and a second end of the strap has removable fastening means to the wearable for animals.

10. The interchangeable system of wearables for animals of number 2, wherein the clips of the fastening system are attached by means of rivets to the wearable.

11. The interchangeable system of wearables for animals of number 10, wherein the rivets have an insert and a head, said insert is placed inside the inner diameter of the base of the clip, coupling to an upper face of the base of the clip, fastening it firmly, the insert has a through hole which houses the stem of the head, which in turn is coupled to the lower portion of the rivet, thus attaching the clip to the wearable for animals.

12. The interchangeable system of wearables for animals of number 1, wherein the wearable comprises a buckle that interacts with a free end of the wearable allowing the mounting or removal of the wearable; allowing the animal to be mounted or dressed interchangeably with a variety of wearables for animals as well as device bodies or compatible devices.

Having described the present invention in sufficient detail, thus proving its industrial application, it is found to have a good degree of novelty, and we therefore claim the following.

The invention claimed is:

1. Interchangeable system of wearables for animals comprising:
    a device with a body having a fastening system with which the device is secured to wearables for animals, the device comprising a protruding lug at each end of the body of the device; and
    at least one pair of clips fastened to the wearables by mechanical attachment, wherein said clips cooperate with the protruding lug to fasten the body of the device to the wearables, wherein the clips are omega circlips that are made up of a semi-toroidal base from which emanate a pair of fingers that are substantially perpendicular to the semi-toroidal base and ends of said omega circlips are bent at right angles in opposite directions.

2. The interchangeable system of wearables for animals of claim 1, wherein the protruding lug at each end of the body of the device has a trapezoidal geometry that allows the fingers of the omega circlip to be inserted through a wider proximal portion of the lug to the body of the device,
    wherein the fingers once inserted slide into a narrower distal end of the lug securing an upper portion of the lug to a bent upper end of the fingers.

3. The interchangeable system of wearables for animals of claim 1, wherein the device further comprises: a pair of covers that cover the body of the device.

4. The interchangeable system of wearables for animals of claim 1, wherein the device houses tracking means.

5. The interchangeable system of wearables for animals of claim 4, wherein the tracking means comprise a GPS.

6. The interchangeable system of wearables for animals of claim 1, wherein the wearables can have two or more pairs of clips, wherein each pair of clips secures the body of the device.

7. The interchangeable system of wearables for animals of claim 1, wherein the body of the device is protected by a covered strap once clipped to the wearable for animals.

8. The interchangeable system of wearables for animals of claim 7, wherein the covered strap at a first end is mechanically attached to the wearables for animals, and a second end of the covered strap has a removable fastening means to the wearables for animals.

9. The interchangeable system of wearables for animals of claim 1, wherein the clips of the fastening system are attached by means of rivets to the wearables for animals.

10. The interchangeable system of wearables for animals of claim 9, wherein the rivets have an insert and a head, said insert is placed inside an inner diameter of the base of the clip, coupling to an upper face of the base of the clip, fastening the insert firmly, the insert has a through hole which houses a stem of the head, which in turn is coupled to a lower portion of the rivet, thus attaching the clip to the wearables for animals.

11. The interchangeable system of wearables for animals of claim 1, wherein the wearables comprises a buckle that interacts with a free end of the wearables allowing the mounting or removal of the wearables; allowing the animal to be mounted or dressed interchangeably with a plurality of wearables for animals as well as device bodies having the fastening system.

\* \* \* \* \*